June 12, 1956     H. G. SCHWARTZ     2,749,960
COMPOSITE STRUCTURES
Filed Sept. 18, 1953
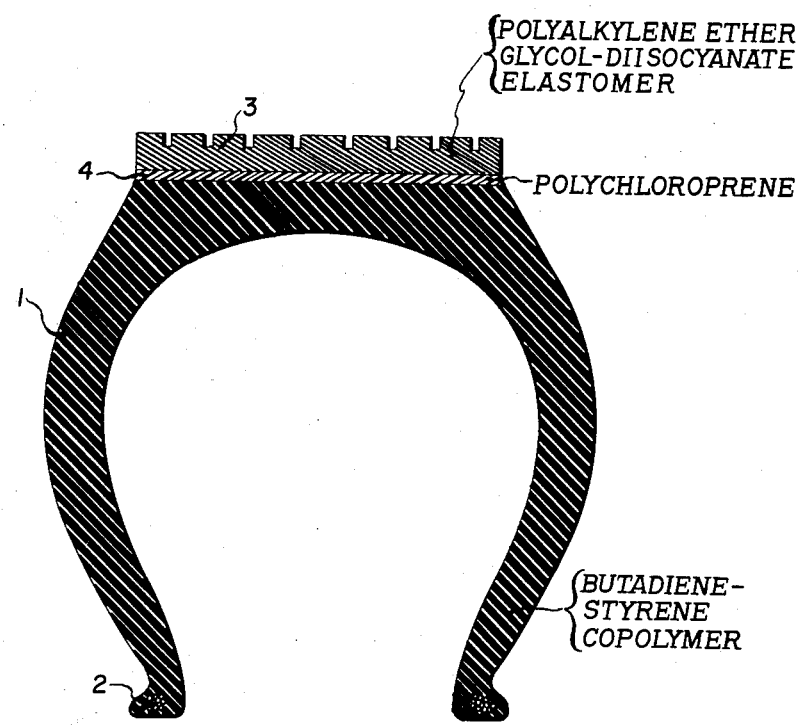
INVENTOR
HAROLD G. SCHWARTZ
BY C. Marshall Dann
ATTORNEY

United States Patent Office 2,749,960
Patented June 12, 1956

2,749,960
COMPOSITE STRUCTURES

Harold G. Schwartz, Woodstown, N. J., assignor to E. I. du Pont de Nemours and Company, Wilmington, Del., a corporation of Delaware Application September 18, 1953, Serial No. 381,143

11 Claims. (Cl. 152—330)

This invention relates to composite elastic structures in which various types of elastomers are adherently joined together. More particularly it relates to composite structures in which polyalkylene ether glycol-diisocyanate elastomers are adherently attached to other elastomers. A particular embodiment relates to vehicle tires in which a polyalkylene ether glycol-diisocyanate elastomer comprises the tread and other elastomers comprise the carcass.

In copending application Serial No. 365,270 of Hill, filed June 30, 1953, there are described valuable new elastomers obtained by the reaction of a polyalkylene ether glycol, an organic diisocyanate and a chain-extending agent such as water. These products have many useful properties including high tensile strength, resistance to heat and cold, sunlight, oil and other hydrocarbons, and abrasion resistance which is higher than that of any other known elastomer. These elastomers have, however, poor adhesion with most of the other common elastomers, and as a result composite structures or laminates with such elastomers cannot be formed directly. The polyalkylene ether glycol-diisocyanate elastomers do not form a good bond with natural rubber or with GR-S butadiene-styrene copolymers, the two elastomers from which most automobile tire carcasses are made. Although the high abrasion resistance of the new elastomers makes them eminently suited for use as tire treads, their poor adhesion to natural rubber or GR-S precludes the manufacture of tires in which such treads are directly bonded to the tire carcasses.

It is an object of this invention to provide composite structures in which polyalkylene ether glycol-diisocyanate elastomers are strongly attached to natural rubber, GR-S and other types of elastomers. A further object is the provision of tire structures having polyalkylene ether glycol-diisocyanate elastomer treads bonded to carcasses made from other elastomers. Further objects will appear from the description of this invention which follows.

These and other objects are accomplished by the present invention in which a layer of a polyalkylene ether glycol-diisocyanate elastomer is attached to an elastomer selected from the group consisting of natural rubber, butadiene-styrene copolymers such as GR-S, Buna S, "Chemigum" IV and "Hycar" OS, butadiene polymers such as Buna 85, Buna 115 and X-638 GR-S, butadiene-acrylonitrile copolymers such as Buna N, Perbunan, "Hycar" OR, "Chemigum" N and "Butaprene" N, and polyacrylic acid ester polymers such as "Hycar" PA, by means of an intervening adherent layer of polychloroprene, i. e. neoprene, a polymer of 2-chlorobutadiene-1,3.

Such composite structures are conveniently prepared by coating one or both of the outer layers with a solution of polychloroprene and thereafter placing the layers together and curing with heat and pressure. A thin sheet of polychloroprene may be employed instead of or in addition to the polychloroprene solution.

In one method of fabricating a tire from uncured stock, the tire carcass comprising natural rubber or GR-S is coated with a solution of polychloroprene and the solvent is allowed to evaporate. A preformed polyalkylene ether glycol-diisocyanate elastomer tread slab is then applied and stitched or rolled down to make good contact with the carcass. The assembly is then placed in a mold and cured under suitable conditions of heat and pressure.

In a convenient method of preparing a retread from a tire composed of natural rubber or GR-S, the surface of the tire carcass is first roughened and then coated with a solution of neoprene. The solvent is allowed to evaporate. A thin sheet or cushion of neoprene is then applied and stitched to secure good contact. A preformed tread slab of polyalkylene ether glycol-diisocyanate elastomer is then applied and stitched or rolled down. The assembly is placed in a mold and curved with the application of heat and pressure. As in the case of tires fabricated from uncured stock, the tread in the retreaded tire is strongly bonded to the carcass.

An automobile tire embodying the present invention is schematically illustrated in cross-section in the attached drawing. In the drawing, a tire carcass 1 composed of natural rubber or GR-S and containing reinforcing bead wires 2 is attached to a tread 3 comprising a polyalkylene ether glycol-diisocyanate elastomer by means of an intervening layer of polychloroprene 4.

The structures of this invention and the method of preparing them are illustrated in the following examples:

EXAMPLE 1

*Adhesion of uncured polyalkylene ether glycol-diisocyanate elastomer to other uncured elastomers*

A. COMPOUNDING OF BASE ELASTOMERS

Stocks of various elastomers are compounded on a water-cooled rubber mill and sheeted off. The compositions of the compounded stocks are shown below (all the figures represent parts by weight):

|  | A | B | C |
|---|---|---|---|
| Natural rubber smoked sheets | 100 |  |  |
| GR-S 1500 [1] |  | 100 |  |
| X-638 GR-S [2] |  |  | 100 |
| Peptizer—36% xylyl mercaptan in 64% inert hydrocarbon | 0.5 |  |  |
| Zinc oxide | 4.0 | 3.5 | 3.5 |
| Sulfur | 2.25 | 1.75 | 1.75 |
| 2-Mercaptothiazoline | 0.8 |  |  |
| Carbon black | 50.0 | 50.0 | 50.0 |
| Softener | 3.0 | 10.0 | 10.0 |
| Stearic acid | 1.0 | 2.0 | 2.0 |
| Phenyl-beta-naphthylamine |  | 1.0 | 1.0 |
| Antioxidant [3] | 1.3 |  |  |
| Tetramethyl thiuram monosulfide |  | 0.3 | 0.3 |
| Benzothiazole disulfide |  | 0.3 | 0.3 |

[1] A butadiene-styrene copolymer.
[2] A butadiene polymer.
(These rubbers are defined in "GR-S and GR-I Synthetic Rubbers" published by Office of Synthetic Rubber, Reconstruction Finance Corporation, Washington, D. C. X-638 GR-S is further characterized in "Rubber Age" 69, 215 (May 1951).)
[3] 25% di-p-methoxydiphenylamine, 25% diphenyl-p-phenylene diamine, 50% phenyl-beta-naphthylamine.

|  | D | E | F | G |
|---|---|---|---|---|
| Silicone SE 76 [4] | 100 |  |  |  |
| "Hycar" OR-25 [5] |  | 100 |  |  |
| "Hycar" PA-21 [6] |  |  | 100 |  |
| GR-I 17 [7] |  |  |  | 100 |
| Silica | 40.0 |  |  |  |
| Benzoyl peroxide | 2.0 |  |  |  |
| Carbon black |  | 50.0 | 50.0 | 50.0 |
| Softener |  | 25.0 | 25.0 |  |
| Zinc oxide |  | 5.0 | 5.0 | 5.0 |
| Stearic acid |  | 1.0 | 1.0 |  |
| Tetramethyl thiuram disulfide |  | 3.0 | 3.0 |  |
| Tetramethyl thiuram monosulfide |  |  |  | 1.0 |
| 2-Mercaptobenzothiazole |  |  |  | 1.0 |
| Sulfur |  |  |  | 2.0 |
| Poly-p-dinitrosobenzene (contains 75% inert filler) |  |  |  | 0.5 |
| Paraffin wax |  |  |  | 1.0 |

[4] Described in "Silicone Product Data," CDC-191-1C, issued 9-15-52 by General Electric Co.
[5] Butadiene-acrylonitrile copolymer.
[6] Polyacrylic acid ester polymer.
[7] Butyl rubber—(defined in "GR-S and GR-I Synthetic Rubbers").

B. PREPARATION OF POLYALKYLENE ETHER GLYCOL-DIISOCYANATE ELASTOMER

One molar part of polytetramethylene ether glycol having an average molecular weight of 2440 and an acid number of 0.5 and containing 0.37 molar part of water and 0.17 molar part of tetrahydrofuran is placed in a Werner-Pfleiderer mixer and 2.1 molar parts of 2,4-tolylene diisocyanate are added at 40° C. Mixing is carried out for 2.25 hours while the temperature is gradually increased to 85° C. The mass is then cooled to 75° C. over a period of 15 minutes and 1.09 molar parts of water are added. Mixing is continued for about 50 minutes while the temperature is increased to 130° C. At the end of this time the mass is in the form of rubbery chunks which no longer stick to the blades of the mixer. The mass is removed from the mixer, worked on a cold rubber mill to form a sheet and stabilized by adding 1.1 parts of piperidine per 100 parts of polymer and homogenizing on the mill. It is then sheeted off the mill rolls.

The elastomeric product so obtained is milled on a rubber mill with 4 parts of di(3-isocyanato-4-methylphenyl) urea per 100 parts of elastomer and sheeted off the mill.

C. PREPARATION OF NEOPRENE CEMENT

The following ingredients are milled together on a rubber mill:

| | Parts |
|---|---|
| Neoprene type GRT [1] | 100 |
| Zinc oxide | 5 |
| Magnesium oxide | 4 |
| Carbon black | 33 |
| Petrolatum | 1 |
| Softener | 5 |
| Tackifier | 5 |
| Di-o-tolylguanidine salt of dicatechol borate | 0.5 |

[1] A polychloroprene stabilized with a thiuram disulfide and containing a non-discoloring anti-oxidant.

The mixture is then blended, by rolling in a container, with enough of a solvent consisting of equal parts of methylethyl ketone and hexane that the final cement contains 20% solids.

D. ADHESION TESTING

Tests are made using squares 6 inch x 6 inch x 0.080 inch thick cut from each of the uncured elastomers described in A and B above.

A series of samples are prepared, in each of which a square of the polyalkylene ether glycol-diisocyanate elastomer is attached to a square of one of the other elastomers. Two such structures are prepared for each of the other elastomers, in one of which no cement is used and in the other of which the polychloroprene cement is employed. In the preparation of the former, a side of each component is swabbed with a 50/50 mixture of methylethyl ketone and hexane, air dried, the two sides placed together and fabric-backed with square woven cotton fabric and cured in a press at 280° F. for one hour. In the preparation of the polychloroprene cemented structures, a side of each component is brushed with the polychloroprene cement described above, air dried, and joined together and finished off exactly as in the case of the structures made without cement.

All the samples are tested 24 hours later on a Scott tester, using a one inch strip, with the following results:

| Sample | Base elastomer | Adhesion, lbs. per in. | |
|---|---|---|---|
| | | No cement | Polychloroprene cement |
| A | Natural rubber | 4 | +78 |
| B | GR-S 1,500 | 6 | 60 |
| C | X-638 GR-S | 6 | 22 |
| D | Silicone SE 76 | 2 | 3 |
| E | "Hycar" OR-25 | 5 | 57 |
| F | "Hycar" PA-21 | 3 | 13 |
| G | GR-I 17 | 5 | 6 |

It is evident that a large increase in adhesion is obtained except in the cases of the silicone and GR-I or butyl rubbers.

EXAMPLE 2

Adhesion of uncured polyalkylene ether glycol-diisocyanate elastomer to cured GR-S

A. PREPARATION OF CURED GR-S

A sample of GR-S 1500 is compounded as follows:

| | Parts |
|---|---|
| GR-S 1500 | 100 |
| Carbon black | 50 |
| Sulfur | 1.75 |
| Zinc oxide | 3.5 |
| Stearic acid | 2.0 |
| Softener | 10.0 |
| N-cyclohexyl-2-benzothiazole sulfonamide | 1.2 |

The mix is blended on a rubber mill, sheeted off and cured.

B. PREPARATION OF POLYCHLOROPRENE CEMENT

A polychloroprene cement is prepared from the following compounded stock:

| | Parts |
|---|---|
| Neoprene GRT | 100 |
| Carbon black | 30 |
| Zinc oxide | 5 |
| Magnesium oxide | 4 |
| Softener | 6 |
| Stearic acid | 1 |
| Phenyl-beta-naphthylamine | 1 |

This stock is extended with toluene to 20% total solids content by rolling in a container.

C. PREPARATION OF NATURAL RUBBER CEMENT

The following ingredients are compounded together:

| | Parts |
|---|---|
| Natural rubber | 100 |
| Carbon black | 45 |
| Zinc oxide | 5.0 |
| Sulfur | 2.5 |
| Stearic acid | 2.0 |
| Softener | 5.0 |
| Phenyl-beta-naphthylamine | 1.0 |
| Salicyclic acid | 0.5 |
| Zinc salt of mercaptobenzothiazole+10% inert hydrocarbon | 1.0 |

The stock is milled to a smooth rolling bank and cut off the mill in small pieces. Fifteen parts are put in 80.75 parts of gasoline and rolled until most of the stock has dissolved. It is then stirred to homogeneity with a mechanical agitator, 4.25 parts of 95% ethanol are added and stirred in to reduce the viscosity.

D. PREPARATION OF NATURAL RUBBER-DIISOCYANATE CEMENT

One hundred (100) parts of natural rubber are milled with 0.1825 part of xylyl mercaptan dissolved in 0.3175 part of inert hydrocarbon until the mixture smooths out and forms a rolling bank on the mill. It is sheeted off the mill, cut in pieces, and rolled on a roller mill with 1060 parts of toluene until it has dissolved as far as possible. It is then stirred with a mechanical agitator until it becomes homogeneous. A solution of 20 parts of methylene-bis-(4-phenylisocyanate) in 20 parts of o-dichlorobenzene is added and stirred in, giving a cement containing 10% solids. (Cements of this type are disclosed in U. S. Patent No. 2,436,222 of Neal and Verbanc.)

E. ADHESION TESTING 6 x 6 inch squares of the compounded uncured polyalkylene ether glycol-diisocyanate elastomer described in Example 1 (B) and 6 x 6 inch squares of the cured GR-S 1500 are cemented together with each of the three cements described in B, C and D of this example by the following procedure:

(a) The cured GR-S squares are wire buffed and washed with carbon tetrachloride;

(b) The surfaces of both the GR-S squares and the polyalkylene ether glycoldiisocyanate elastomer squares are coated with the cement and the solvent allowed to evaporate;

(c) The coated surfaces are placed together and rolled; and (d) The assemblies are put in a plunger-type mold and cured under heat and pressure.

Adhesion of the several composite structures, as determined by hand tear, is as follows:

| Cement | Adhesion |
| --- | --- |
| Polychloroprene | Good—could not be separated. |
| Natural rubber | Fair—separated without difficulty. |
| Natural rubber—diisocyanate | Poor—easily separated. |
| Natural rubber—diisocyanate as precoat+natural rubber top coat. | Fair—separated without difficulty. |

EXAMPLE 3

*Effect of polychloroprene type on adhesion of polyalkylene ether glycol-diisocyanate elastomer to other elastomers*

Different types of polychloroprene are compounded on a rubber mill as follows:

|  | A | B | C |
| --- | --- | --- | --- |
| Neoprene Type GN [1] | 100 | | |
| Neoprene Type W [2] | | 100 | |
| Neoprene Type GRT [3] | | | 100 |
| Zinc oxide | 5 | 5 | 5 |
| Magnesium oxide | 4 | 4 | 4 |
| Carbon black | 30 | 30 | 30 |
| Phenyl-beta-naphthylamine | 1 | 1 | 1 |
| Softener | 7 | 7 | 7 |
| 2-Mercaptoimidazoline | | 0.5 | |

[1] A polychloroprene stabilized with a thiuram disulfide.
[2] A polychloroprene of more uniform molecular weight distribution. Contains no sulfur or compounds capable of decomposing to give sulfur or vulcanization accelerators.
[3] A polychloroprene stabilized with a thiuram disulfide and containing a non-discoloring anti-oxidant.

Cements are prepared by rolling on a roller mill in cans 100 parts of each compounded sample with 400 parts of toluene for 24 hours.

6 x 6 inch squares (0.080 inch thickness) are cut from a sheet of GR-S 1500 prepared as in Example 1-A (A) and from a sheet of polyalkylene ether glycol-diisocyanate elastomer prepared as in Example 1-B, except that 2,4-tolylene diisocyanate is used as curing agent instead of di(3-isocyanato-4-methylphenyl) urea. One side of the GR-S and one side of the polyalkylene ether glycol-diisocyanate elastomer are brushed with a polychloroprene cement, air-dried, put together, backed with squarewoven cotton fabric and heated in a press at 280° F. for 60 minutes.

Structures of this type using each of the three polychloroprene cements are tested in a Scott tester for 1 inch strip adhesion. The results are as follows:

| Sample | Polychloroprene type | Adhesion, lbs. per in. |
| --- | --- | --- |
| A | Neoprene GN | 70 |
| B | Neoprene W | 35 |
| C | Neoprene GRT | 100 |

EXAMPLE 4

*Fabrication of a retreaded tire*

In the preparation of the elastomer for the tire tread, one mol of polytetramethylene ether glycol having an average molecular weight of 2900 and an acid number of 0.17 and containing 0.36 mol of water is placed in a Werner-Pfleiderer mixer, and heated to 90° C. There are added 2.3 mols of 2,4-tolylene diisocyanate and mixing proceeds for 2.25 hours at 100–105° C. The mass is cooled to 75° C. and 1.17 mols of water are added. Mixing is continued for a further 70 minutes while the temperature is increased to 130° C. At the end of this time the polymer is in the form of rubbery chunks which do not stick to the mixer blades. The mass is removed from the mixer and sheeted on a cold rubber mill. 1.7 parts of piperidine per 100 parts of polymer are added during this time to stabilize the polymer, which is then sheeted off the mill.

A polychloroprene cement is made up by compounding the following ingredients on a rubber mill:

| | Parts |
| --- | --- |
| Neoprene type GRT | 100 |
| Zinc oxide | 5 |
| Magnesium oxide | 4 |
| Carbon black | 33 |
| Petrolatum | 1 |
| "Circo" light process oil softener | 5 |
| Plasticizer softener | 5 |
| Di-o-tolylguanidine salt of dicatechol borate | 0.5 |

One hundred (100) parts of this material are put in a can with 200 parts of methylethyl ketone and 200 parts of hexane and rolled on a roller mill for 24 hours to give a homogeneous cement.

A commercial automobile tire is buffed to remove the anti-skid markings on the tread. The resulting roughened GR-S surface is coated with two coats of the above polychloroprene cement approximately 2 hours before the tread stock described below is ready to be applied.

The polyalkylene ether glycol-diisocyanate elastomer prepared as described above is placed on a cold 30 inch rubber mill and worked, the temperature of the cooling water in the rolls being 7° C. The product is banded on the mill and the rolling bank is reduced to 2 inches by opening the rolls. For each 100 parts of polymer there are then added 40 parts of carbon black, which is worked in. The bank size is reduced to 2 inches again and there are added 6 parts of 2,4-tolylene diisocyanate for each 100 parts of polymer on the mill. The stock is rolled to complete the incorporation of the diisocyanate. The total time on the mill is 10 minutes.

Two layers of neoprene type GRT of 20 mils thickness are applied to a calender take-off wheel 94 inches in circumference. The top layer is coated with the polychloroprene cement described above and air-dried for 2 hours. The polyalkylene ether glycol-diisocyanate elastomer tread stock is then calendered to a thickness of approximately 50 mils and a strip 5 inches wide is taken off onto the previously prepared polychloroprene cushion on the calender take-off wheel. Additional strips having approximately the same thickness are applied in the same manner until a total thickness of 0.375 inch of the tread stock is put on. The tread stock has good building tack, and is smooth off the calender. The calender is run with the center roll at 49° C. and the top roll at 32° C. The tread is then removed from the wheel. The neoprene side of the stock is swabbed with $CCl_4$ to freshen it.

The composite tread is then applied to the tire carcass which has been previously buffed and coated with polychloroprene, and the composite structure is cured in a retread mold for 60 minutes at 138° C. The retreaded tire is then cooled with water, allowed to stand for 15 hours, again heated for 15 minutes and removed from the mold.

The tire is placed on an automobile and at the end of a 20,000 mile road test shows no separation of the tread stock from the carcass of the tire.

EXAMPLE 5

*Fabrication of a retreaded tire*

The elastomer for the tire tread is prepared as follows:

One molar part of a polytetramethylene ether glycol having an average molecular weight of 2900 and an acid number of 0.78 and containing 0.37 molar part of water is put into a Werner-Pfleiderer mixer and there are added 2.1 molar parts of 2,4-tolylene diisocyanate at 40° C. The charge is mixed while heating to 81° C. over a 3 hour period. There are added 1.09 molar parts of water and mixing is continued for about 75 minutes while the temperature is increased to 140° C. At the end of this time the polymer is in the form of rubbery chunks which no longer stick to the mixer blades. The mass is transferred to a cold rubber mill and sheeted out while 0.5 part of piperidine per 100 parts of polymer is added as a stabilizer. The polymer is then sheeted off the mill.

Tread stock is prepared from this elastomer by milling 100 parts of it with 15 parts of carbon black and 4 parts of di(3-isocyanato-4-methylphenyl) urea, and sheeting the thoroughly mixed product off the mill.

A polychloroprene cement is prepared by compounding the following formulation on a rubber mill:

|  | Parts |
|---|---|
| Neoprene type GRT | 100 |
| Zinc oxide | 5 |
| Magnesium oxide | 4 |
| Carbon black | 30 |
| Softener | 5 |
| Tackifier | 5 |
| Phenyl-beta-naphthylamine | 1 | and thereafter rolling 100 parts of the formulation on a roller mill in cans for 24 hours with 400 parts of toluene.

A tire is fabricated with this tread stock and cement just as in Example 4 except that the tread stock is built up only to 0.350 inch. It is cured in a retread tire mold at 138° C. for 60 minutes and removed after cooling as before.

The tire is placed on a test car and tested on the road. After 25,000 miles there is no separation of the tread stock from the GR-S carcass.

Instead of building the tire tread up on a calender take-off wheel, the polyalkylene ether glycol-diisocyanate elastomer tread stock can be compounded and then extruded through a die in a strip of the proper width, thickness and contour to form a tire tread. The polychloroprene cushion can be applied to the tread by means of polychloroprene cement and this assembly can then be applied to the tire carcass. Equally good adhesion is obtained by this procedure. The resulting tires survive similar road tests without separation of the tread from the carcass.

The polyalkylene ether glycol-diisocyanate elastomers with which this application is concerned are those disclosed and claimed in application Serial No. 365,270 of Frederick B. Hill, Jr., filed June 30, 1953. These products are prepared by reacting together a high molecular weight polyalkylene ether glycol, an organic diisocyanate and a chain-extending agent containing a plurality of active hydrogen atoms. Preferred products are those made using polytetramethylene ether glycol having a molecular weight of at least 750, an arylene diisocyanate such as 2,4-tolylene diisocyanate, and water. These elastomers may be compounded with fillers, plasticizers, antioxidants, accelerators and other usual additives for elastomers. It is often desirable to use a product which has been hot-milled as disclosed in application Serial No. 348,113, filed April 10, 1953, now U. S. Patent No. 2,702,797, to reduce scorching. To cure properly, the elastomer should either contain an adequate amount of unreacted isocyanate groups or should have added to it a curing agent such as a diisocyanate, a diisocyanate dimer or a di-(isocyanatoaryl) urea.

Polychloroprene appears to be unique in its ability to cause adherence of the polyalkylene ether glycol-diisocyanate elastomers to the other elastomers present in the composite structures. The polyalkylene ether glycol-diisocyanate elastomer will not adhere directly to natural rubber, GR-S, butadiene-acrylonitrile copolymers, polyacrylic acid ester polymers, or butadiene polymers, but in each case a strong bond may be achieved using the polychloroprene interlayer. Polychloroprene appears to be ineffective in bonding the polyalkylene ether glycol-diisocyanate elastomers to butyl rubber or to silicone rubber.

The polychloroprene adhesive layer should be at least 1 to 2 mils thick and may be very much thicker, although there is no advantage in using a layer thicker than about 200 to 300 mils. When a polychloroprene sheet is placed between the two outside layers, it will ordinarily be from 20 to 80 mils thick and preferably from about 40 to 50 mils. Polychloroprene solutions may be made up by any of the conventional methods described in "The Neoprenes" by N. L. Catton, published by E. I. du Pont de Nemours and Company, Inc., Rubber Chemicals Division (1953). Suitable solvents include toluene and mixtures of hexane and methylethyl ketone. The polychloroprene used in solution or as a calendered interlayer sheet may contain various compounding agents such as peptizers, anti-oxidants, plasticizers, carbon blacks, etc.

The composite structures of this invention are useful in any application where it is desired to take advantage of the different properties of the polyalkylene ether glycol-diisocyanate elastomers and the other conventional types. Such structures are particularly useful in pneumatic or solid tires, in which natural rubber or GR-S may be used to form the carcass of the tire in which the cords are embedded, and the polyalkylene ether glycol-diisocyanate elastomer may be used to form the tread or wearing surface. The tires may be of either new or retreaded construction, and display superior tread wear resistance without the tendency for tread separation which is encountered when it is attempted to bond the polyalkylene ether glycol-diisocyanate elastomers to the tire carcass directly or with adhesives other than neoprene. Other applications of the composite structures of this invention include wire or cable jackets, waterproof wrappings, hose structures and the like.

What is claimed is:

1. A composite elastic structure comprising a layer of a polyalkylene ether glycol-diisocyanate elastomer said glycol having a molecular weight of at least 750, a polychloroprene layer, and a layer of an elastomer selected from the group consisting of natural rubber, butadiene-styrene copolymers, butadiene polymers, butadiene-acrylonitrile copolymers, and polyacrylic acid ester polymers, the polychloroprene layer being in intimate adherent relationship with and interposed between the other two layers.

2. The structure of claim 1 in which the polyalkylene ether glycol-diisocyanate elastomer is a reaction product of a polytetramethylene glycol having a molecular weight above 750, an arylene diisocyanate and water.

3. The structure of claim 1 in which the polyalkylene ether glycol-diisocyanate elastomer is a reaction product of a polytetramethylene ether glycol having a molecular weight above 750, 2,4-tolylene diisocyanate and water.

4. A composite elastic structure comprising a layer of a polyalkylene ether glycol-diisocyanate elastomer said glycol having a molecular weight of at least 750, a polychloroprene layer and a layer of natural rubber, the polychloroprene layer being in intimate adherent relationship with and interposed between the other two layers.

5. A composite elastic structure comprising a layer of a polyalkylene ether glycol-diisocyanate elastomer said glycol having a molecular weight of at least 750, a polychloroprene layer and a layer of a butadiene-styrene copolymer, the polychloroprene layer being in intimate adherent relationship with and interposed between the other two layers.

6. A vehicle tire having a tread comprising a polyalkylene ether glycol-diisocyanate elastomer said glycol having a molecular weight of at least 750, said tread being attached by an intervening adherent polychloroprene layer to a carcass comprising natural rubber.

7. A vehicle tire having a tread comprising a polyalkylene ether glycol-diisocyanate elastomer said glycol having a molecular weight of at least 750, said tread being attached by an intervening adherent polychloroprene layer to a carcass comprising a butadiene-styrene copolymer.

8. A vehicle tire having a tread comprising an elastomeric reaction product of a polytetramethylene ether glycol having a molecular weight of at least 750, 2,4-tolylene diisocyanate and water, said tread being attached by an intervening adherent polychloroprene layer to a carcass comprising natural rubber.

9. A vehicle tire having a tread comprising an elastomeric reaction product of a polytetramethylene ether glycol having a molecular weight of at least 750, 2,4-tolylene diisocyanate and water, said tread being attached by an intervening adherent polychloroprene layer to a carcass comprising butadiene-styrene copolymer.

10. A vehicle tire having an outer wearing surface comprising a polyalkylene ether glycol-diisocyanate elastomer said glycol having a molecular weight of at least 750, said elastomer being attached by an intervening adherent polychloroprene layer to an inner portion of the tire casing comprising natural rubber.

11. A vehicle tire having an outer wearing surface comprising a polyalkylene ether glycol-diisocyanate elastomer said glycol having a molecular weight of at least 750, said elastomer being attached by an intervening adherent polychloroprene layer to an inner portion of the tire casing comprising a butadiene-styrene copolymer.

References Cited in the file of this patent

UNITED STATES PATENTS

| | | |
|---|---|---|
| 2,418,025 | Garvey | Mar. 25, 1947 |
| 2,471,905 | Smith | May 31, 1949 |
| 2,501,493 | Beward | Mar. 21, 1950 |
| 2,621,166 | Schmidt | Dec. 9, 1952 |
| 2,650,212 | Windemuth | Aug. 25, 1953 |
| 2,675,855 | Heintz | Apr. 20, 1954 |
| 2,692,873 | Langerak et al. | Oct. 26, 1954 |
| 2,713,884 | Schwartz | July 26, 1955 |